(12) United States Patent
Gomer et al.

(10) Patent No.: US 12,409,636 B2
(45) Date of Patent: Sep. 9, 2025

(54) HEATABLE COMPOSITE PANE FOR A PROJECTION ASSEMBLY

(71) Applicant: SAINT-GOBAIN GLASS FRANCE, Courbevoie (FR)

(72) Inventors: Andreas Gomer, Kerpen (DE); Valentin Schulz, Niederzier (DE); Marcel Klein, Baesweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/546,736

(22) PCT Filed: Mar. 30, 2022

(86) PCT No.: PCT/EP2022/058349
§ 371 (c)(1),
(2) Date: Aug. 16, 2023

(87) PCT Pub. No.: WO2022/214369
PCT Pub. Date: Oct. 13, 2022

(65) Prior Publication Data
US 2024/0131822 A1 Apr. 25, 2024
US 2024/0227365 A9 Jul. 11, 2024

(30) Foreign Application Priority Data
Apr. 9, 2021 (EP) ..................... 21167614

(51) Int. Cl.
*B32B 17/10* (2006.01)
*G02B 27/01* (2006.01)
*G06F 3/01* (2006.01)

(52) U.S. Cl.
CPC .. *B32B 17/10495* (2013.01); *B32B 17/10036* (2013.01); *B32B 17/10211* (2013.01);
(Continued)

(58) Field of Classification Search
CPC ....................................................... G06F 3/011
See application file for complete search history.

(56) References Cited

U.S. PATENT DOCUMENTS

| 2004/0135742 A1 | 7/2004 | Weber et al. |
| 2009/0295681 A1 | 12/2009 | Kaminski et al. |

(Continued)

FOREIGN PATENT DOCUMENTS

| DE | 103 52 464 A1 | 6/2005 |
| DE | 10 2009 020824 A1 | 2/2010 |

(Continued)

OTHER PUBLICATIONS

Kaminski et al. DE102009020824 A1 machine translation (Year: 2024).*

(Continued)

*Primary Examiner* — Gustavo Polo
(74) *Attorney, Agent, or Firm* — Pillsbury Winthrop Shaw Pittman LLP

(57) ABSTRACT

A composite pane, in particular for a projection assembly, includes an outer pane, an inner pane, and a thermoplastic intermediate layer arranged between the outer and the inner pane, wherein the outer and the inner pane have in each case an outer face and an inner face, and the inner face of the outer pane and the outer face of the inner pane face one another, a first masking strip, which is arranged regionally on one of the outer faces or the inner faces of the inner or the outer pane, an electrically conductive coating, and a reflection layer, which is suitable for reflecting light, wherein the reflection layer is arranged spatially in front of the first masking strip when viewed from the inner pane toward the outer pane, wherein the first masking strip overlaps the reflection layer at least in one region.

21 Claims, 7 Drawing Sheets

Figure 1A:
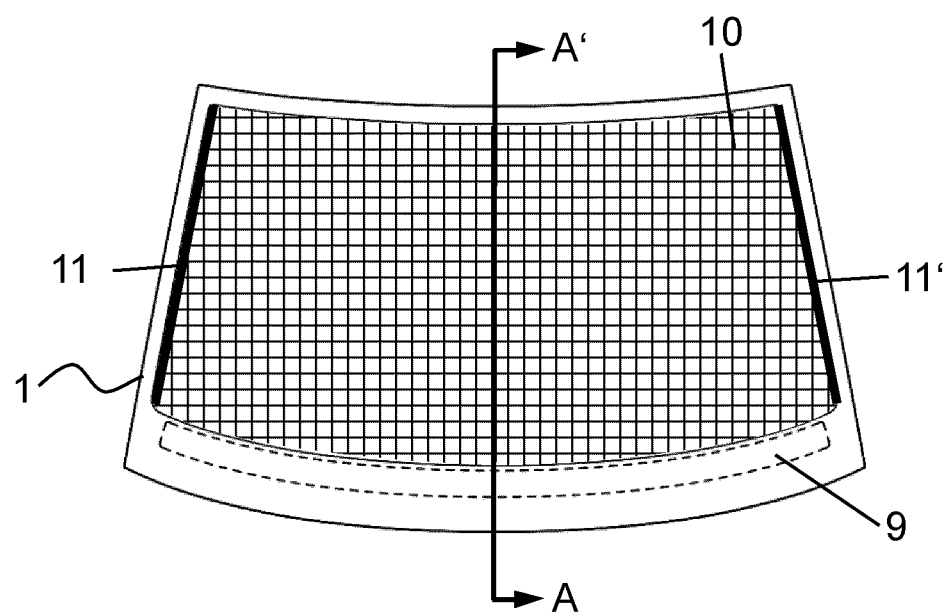

(52) U.S. Cl.
CPC .. *B32B 17/10229* (2013.01); *B32B 17/10266* (2013.01); *B32B 17/10348* (2013.01); *B32B 17/10385* (2013.01); *B32B 17/10605* (2013.01); *B32B 17/10761* (2013.01); *B32B 17/10899* (2013.01); *G02B 27/0101* (2013.01); *G06F 3/011* (2013.01); *B32B 2307/41* (2013.01); *B32B 2307/416* (2013.01); *B32B 2307/418* (2013.01); *B32B 2457/20* (2013.01); *B32B 2605/08* (2013.01); *G02B 2027/0194* (2013.01); *G06F 3/017* (2013.01)

(56) References Cited

U.S. PATENT DOCUMENTS

| | | | | |
|---|---|---|---|---|
| 2014/0368906 | A1* | 12/2014 | Kim | G02B 5/0294 427/163.3 |
| 2018/0098386 | A1* | 4/2018 | Masschelein | B32B 17/10192 |

FOREIGN PATENT DOCUMENTS

| | | |
|---|---|---|
| DE | 10 2014 220189 A1 | 4/2016 |
| EP | 0 844 507 A1 | 5/1998 |
| EP | 2 803 246 B1 | 5/2017 |
| JP | H10-148787 A | 6/1998 |
| JP | 2007-099199 A | 4/2007 |
| JP | 2019-073408 A | 5/2019 |
| JP | 2019-511987 A | 5/2019 |
| JP | 2019-527158 A | 9/2019 |
| WO | WO 96/19347 A2 | 6/1996 |
| WO | WO 03/024155 A2 | 3/2003 |
| WO | WO 2013/104439 A1 | 7/2013 |
| WO | WO 2017/157660 A1 | 9/2017 |
| WO | WO 2021/209201 A1 | 10/2021 |
| WO | WO 2022/073860 A1 | 4/2022 |
| WO | WO 2022/073894 A1 | 4/2022 |
| WO | WO 2022/161894 A1 | 8/2022 |
| WO | WO 2022/179817 A1 | 9/2022 |

OTHER PUBLICATIONS

Saint-Gobain DE10352464 A1 machine translation (Year: 2024).*
Machine Translation of Touge et al. JP 2019-073408 A (Year: 2024).*
International Search Report as issued in International Patent Application No. PCT/EP2022/058349, dated Jun. 8, 2022.
Notice of Reasons for Rejection as issued in Japanese Patent Application No. 2023-549606, dated Jul. 2, 2024.

* cited by examiner

HEATABLE COMPOSITE PANE FOR A PROJECTION ASSEMBLY

CROSS-REFERENCE TO RELATED APPLICATIONS

This application is the U.S. National Stage of PCT/EP2022/058349, filed Mar. 30, 2022, which in turn claims priority to European patent application number 21167614.3 filed Apr. 9, 2021. The content of these applications are incorporated herein by reference in their entireties.

The invention relates to a heatable composite pane for a projection assembly, a method for production thereof, use thereof, and a projection assembly.

Head-up displays are often used nowadays in vehicles and aircraft. The operation of a head-up display proceeds through the use of an imaging unit that, by means of an optics module and a projection surface, projects an image that is perceived by the driver as a virtual image. When this image is reflected, for example, via the vehicle windshield as a projection surface, important data that significantly improve traffic safety can be displayed for the user.

Usually, vehicle windshields consist of two glass panes that are laminated to one another via at least one thermoplastic film. In typically used head-up displays, the problem arises that the projector image is reflected on both surfaces of the windshield. Thus, the driver perceives not only the desired primary image, which is caused by the reflection on the interior-side surface of the windshield (primary reflection). The driver also perceives a slightly offset secondary image, usually weaker in intensity, which is caused by the reflection on the exterior-side surface of the windshield (secondary reflection). This problem is commonly resolved in that the reflecting surfaces are arranged at an angle relative to one another that is deliberately selected such that the primary image and the secondary image coincide, as a result of which the secondary image is no longer disturbingly noticeable.

The radiation of the head-up display projector is typically substantially s-polarized due to the better reflection characteristics of the windshield compared to p-polarized light. However, if the driver wears polarization-selective sunglasses that transmit only p-polarized light, he can hardly perceive the HUD image, or not at all. There is, consequently, a need for HUD projection assemblies that are compatible with polarization-selective sunglasses. A solution of the problem in this connection is, consequently, the use of projection assemblies that use p-polarized light.

A further problem is the perceivability of the information transmitted via the reflected image regardless of weather and lighting conditions. Crucial and safety-relevant information must be sufficiently perceivable by the driver at any time of day or night and in strong sunshine or rain. Consequently, when designing a display based on head-up display technology, care must be taken to ensure that the projector has correspondingly high power such that the projected image has sufficient brightness, in particular in the case of incident sunlight, and is readily recognizable by the viewer. This requires a certain size of the projector and is associated with corresponding power consumption.

DE 102014220189A1 discloses a head-up display projection assembly operated with p-polarized radiation to generate a head-up display image. Since the angle of incidence is typically close to Brewster's angle and p-polarized light is therefore reflected only to a small extent by the glass surfaces, the windshield has a reflective structure that can reflect p-polarized light in the direction of the driver. A single metallic layer with a thickness from 5 nm to 9 nm, for example, made of silver or aluminum, which is applied on the outer face of the inner pane facing away from the interior of the passenger car, is proposed as the reflective structure.

US 2004/0135742A1 likewise discloses a head-up display projection assembly operated with p-polarized radiation to generate a head-up display image and having a reflective structure that can reflect p-polarized radiation in the direction of the driver. The multi-ply polymer layers disclosed in WO 96/19347A3 are proposed as the reflective structure.

When designing a display that is based on head-up display technology, care must further be taken to ensure that the projector has correspondingly high power such that the projected image has sufficient brightness, in particular in the case of incident sunlight and is readily recognizable by the viewer. This requires a certain size of the projector and is associated with corresponding power consumption as well as heat dissipation.

DE 102009020824A1 discloses a virtual image system with a reflecting mylar application that is applied on a composite pane in overlap with a black material. The composite pane can, for example, be installed as a windshield in a vehicle, wherein the mylar application is irradiated with a virtual image from an image display device and the image is reflected into the vehicle interior for a viewer. The image display device is preferably arranged using an air vent, such as those used for heating the composite pane, such that it is not discernible to a driver.

Another major challenge while driving is the heating of the windshield in order to be able to prevent icing or fogging of the pane which impedes visibility. In addition, the projected image must be readily legible under all weather and temperature conditions. This can be impaired by condensation on the pane. The pane is normally heated by heated air blown onto pane via inlets. This type of heating is summarized as the heating, ventilation, and air conditioning (HVAC) method. In addition to the enormous energy consumption, the inlets, via which the hot air is transported and blown onto the pane, require a great deal of space. Furthermore, the air vent usually has to be installed in the form of outlet nozzles in a specific geometric relation to the pane, which, in turn, significantly limits design freedom. These air vents or outlet nozzles make it difficult to accommodate projectors or image display devices in a dashboard. These are typically positioned in the region of the air vents of the dashboard, making heating of the pane poorer or completely impossible.

Alternatively, the pane itself can have an electrical heating function. From DE 103 52 464 A1, for example, a composite glass pane is known in which electrically heatable wires are placed between two glass panes. The specific heating output can be adjusted by the ohmic resistance of the wires. Because of design and safety aspects, both the number of wires and the diameter of the wires must be kept as small as possible. The wires must not be visible or must be hardly perceivable in daylight and at night with headlight illumination.

Also known are transparent, electrically conductive coatings, in particular based on silver. Such electrically conductive coatings can be used as coatings with reflecting properties for the infrared range or even as heatable coatings. WO 03/024155 A2 discloses, for example, an electrically conductive coating with two silver layers. Such coatings usually have sheet resistances in the range from 3 ohm/square.

One problem of electrically conductive coatings is their frequently high sheet resistance, which requires a high operating voltage, at least in the case of large dimensions of the pane to be heated or in the case of long current paths, which is, in any case, higher than the usual on-board voltages of vehicles. WO 2013/104439 A1 and EP 2803246 B1 disclose an electrically conductive coating for heating a pane that consists of different layers. At least one of these layers contains a high-refractive-index material with a refractive index greater than or equal to 2.1. The sheet resistance of the electrically conductive coating can thus be significantly reduced and is thus preferably less than 1 ohm/square.

Consequently, the object of the present invention consists in providing an improved composite pane for projection assemblies that are based on HUD technology.

According to the invention, the object of the present invention is accomplished by a composite pane according to claim 1. Preferred embodiments are apparent from the subclaims.

According to the invention, a composite pane that is intended in particular for a projection assembly is described. The composite pane comprises at least:
 an outer pane, an inner pane, and a thermoplastic intermediate layer arranged between the outer and inner pane,
 an electrically conductive coating,
 a first masking strip,
 and a reflection layer.

The outer and inner pane have in each case an outer face and an inner face. The inner face of the outer pane and the outer face of the inner pane face one another.

The first masking strip is arranged regionally on one of the outer faces or the inner faces of the inner or the outer pane. The reflection layer is suitable for reflecting light.

When viewed from the inner pane toward the outer pane, the reflection layer is arranged spatially in front of the first masking strip, with the first masking strip in overlap with the reflection layer at least in one region.

The reflection layer and the first masking strip can be arranged on different outer or inner faces of the inner or the outer pane. Alternatively, the reflection layer and the first masking strip can also be arranged on the same outer or inner face of the inner pane or the inner face of the outer pane. The reflection layer can have sections that are not in overlap with the first masking strip, i.e., the reflection layer includes at least one region, in which it is situated in front of the first masking strip when viewed from the inner pane toward the outer pane.

The electrically conductive coating can be arranged regionally or completely on the inner face or the outer face of the outer pane, the inner face or the outer face of the inner pane, within the thermoplastic intermediate layer, or on the masking strip. Preferably, the electrically conductive coating is arranged between the outer pane and the inner pane.

In the context of the invention, "between the outer pane and the inner pane" means that the electrically conductive coating can be arranged within the thermoplastic intermediate layer, on the inner face of the outer pane, or on the outer face of the inner pane. If the first masking strip is also arranged between the outer pane and the inner pane, the electrically conductive coating can also be arranged on the masking strip or the first masking strip can be arranged on the electrically conductive coating.

In the context of the invention, the description that, for example, an element A completely overlaps an element B means that the orthonormal projection of element A to the surface plane of element B is arranged completely within element B. It goes without saying that "overlaps in a region" means that the orthonormal projection of element A to the surface plane of element B is arranged within element B only regionally.

Various preferred layer sequences of the composite pane according to the invention are described in the following:

(1) If the first masking strip is arranged on the outer face of the outer pane and the electrically conductive coating is arranged on the inner face of the outer pane, the reflection layer can be arranged on the inner or the outer face of the inner pane or within the thermoplastic intermediate layer. Alternatively, the reflection layer can also be arranged on the inner face of the outer pane and on the electrically conductive coating. In another alternative, the reflection layer can also be arranged only on the inner face of the outer pane or on the electrically conductive coating.

(2) If the first masking strip is arranged on the inner face of the outer pane and the electrically conductive coating is also arranged on the inner face of the outer pane or on the first masking strip or on the first masking strip and the inner face of the outer pane, the reflection layer can be arranged on the inner or the outer face of the inner pane or within the thermoplastic intermediate layer. Alternatively, the reflection layer can also be arranged on the inner face of the outer pane and the electrically conductive coating and the first masking strip. In another alternative, the reflection layer can be arranged on the first masking strip and the inner face of the outer pane. In another alternative, the reflection layer can be arranged on the first masking strip and the electrically conductive coating. In addition, the reflection layer can also be arranged only on the masking strip.

(3) If the first masking strip is arranged on the outer face of the inner pane and the electrically conductive coating is arranged on the outer face of the inner pane or on the first masking strip or on the first masking strip and the outer face of the inner pane, the reflection layer can be arranged on the inner face of the inner pane.

(4) If the first masking strip is arranged on the inner face of the inner pane and the electrically conductive coating is arranged on the inner face of the outer pane or the outer face of the inner pane, the reflection layer can be arranged on the first masking strip and the inner face of the inner pane. In addition, the reflection layer can also be arranged only on the masking strip.

(5) If the first masking strip is arranged on the outer face of the outer pane and the electrically conductive coating is arranged on the outer face of the inner pane, the reflection layer can be arranged on the inner face of the outer pane, the inner face of the inner pane, or within the thermoplastic intermediate layer. Alternatively, the reflection layer can also be arranged on the outer face of the inner pane or the electrically conductive coating. In another alternative, the reflection layer can also be arranged on the outer face of the inner pane and the electrically conductive coating.

(6) If the first masking strip is arranged on the inner face of the outer pane and the electrically conductive coating is arranged on the outer face of the inner pane, the reflection layer can be arranged on the inner face of the inner pane or within the thermoplastic intermediate layer. Alternatively, the reflection layer can also be arranged on the outer face of the inner pane or the electrically conductive coating. Also, the reflection layer can be arranged on the outer face of the inner pane and the electrically conductive coating. As another alternative, the reflection layer can be arranged on the inner face of the outer pane and the first masking strip or only on the first masking strip.

(7) If the first masking strip is arranged on the outer face of the inner pane and the electrically conductive coating is arranged on the inner face of the outer pane, the reflection layer can be arranged on the inner face of the inner pane.

The electrically conductive coating can overlap the first masking strip and/or the reflection layer. It can also be arranged regionally or completely on the first masking strip.

The composite pane is intended to separate an interior from external surroundings. The inner face of the inner pane faces the interior and the outer face of the outer pane faces the external surroundings. In the context of the invention, the expression "when viewed from the inner pane toward the outer pane, the reflection layer is arranged spatially in front of the first masking strip" means that the reflection layer is spatially closer to the interior than the first masking strip. I.e., when viewed through the composite pane from the interior outward, the reflection layer is arranged spatially in front of the first masking strip. The outer pane and the inner pane preferably have two opposite side edges and an upper edge and a lower edge. In the installed position, the upper edge is intended to be arranged in the upper region, while the opposite, lower edge is intended to be arranged in the lower region in the installed position.

The electrically conductive coating is preferably transparent. The first masking strip is opaque. The reflection layer can be opaque or transparent. Preferably, the reflection layer is transparent.

In the context of the present invention, "transparent" means that the total transmittance of the composite pane complies with the legal requirements for windshields (for example, the directives of the European Union ECE-R43) and preferably has transmittance for visible light of more than 50% and in particular of more than 60%, for example, more than 70% (ISO 9050:2003). Accordingly, "opaque" means light transmittance of less than 10%, preferably less than 5%, and in particular 0%.

The present invention is based on the realization that the reflection layer in at least regional overlap with the first masking strip enables a good image display with high contrast to the opaque first masking strip such that it appears bright and is thus also excellently recognizable. Advantageously, this enables a reduction in the power of an image display device and thus reduced energy consumption and heat generation. Due to the electrically conductive coating, it is possible to largely dispense with the use of outlet nozzles for heating the composite pane, freeing up space in a vehicle for an image display device. This is a major advantage of the invention.

In a particular embodiment of the invention, the reflection layer is arranged on the outer face of the inner pane or on one of the inner faces of the inner or the outer pane, within the thermoplastic intermediate layer, or on the first masking strip, wherein the first masking strip has a larger surface expanse than the reflection layer and completely overlaps the reflection layer. In this embodiment, the reflected image is particularly high in contrast, since the reflection layer is arranged completely in front of the first masking strip.

The first masking strip is preferably arranged circumferentially in a frame-like manner in an edge region of the inner or the outer face of the outer pane and has, in particular in one section that is in overlap with the reflection layer, a greater width than in sections different therefrom. The first masking strip is particularly preferably arranged on the inner or the outer face of the outer pane along the side edges and the upper and lower edge. In the context of the present invention, "having a greater width" means that the masking strip has, in this section perpendicular to its extension, a greater width than in other sections. In this way, the masking strip can be suitably adapted to the dimensions of the reflection layer.

The first masking strip is preferably a coating comprising one or a plurality of layers. Alternatively, however, it can also be an opaque element inserted into the composite pane, for example, a film.

According to a preferred embodiment of the composite pane, the first masking strip consists of a single layer. This has the advantage of particularly simple and economical production of the composite pane, since only a single layer has to be formed for the masking strip.

In addition to the mode of action described in the context of the invention, it can also serve as masking of structures otherwise discernible through the pane in the installed state. In particular, in the case of a windshield, the first masking strip serves to mask an adhesive bead for gluing the windshield into a vehicle body. This means it prevents viewing the usually irregularly applied adhesive bead from the outside such that a harmonious overall impression of the windshield is created. On the other hand, the masking strip serves as UV protection for the adhesive used. Continuing irradiation with UV light damages the adhesive and, over time, would loosen the bond of the pane to the vehicle body. In the case of panes with an electrically controllable functional layer, the first masking strip can, for example, also serve to conceal bus bars and/or connection elements.

The first masking strip is preferably printed onto the outer pane, in particular by screen printing. The printing ink is pressed through a fine-meshed fabric onto the glass pane. The printing ink is, for example, pressed through the fabric with a rubber squeegee. The fabric has regions permeable to the printing ink in addition to regions impermeable to the ink, which define the geometric shape of the print. The fabric thus acts as a stencil for the print. The printing ink contains at least one pigment and glass frits suspended in a liquid phase (solvent), for example, water or organic solvents such as alcohols. The pigment is typically a black pigment, for example, carbon black, aniline black, bone black, iron oxide black, spinel black, and/or graphite.

After the ink is printed, the glass pane is subjected to a temperature treatment in which the liquid phase is expelled by evaporation and the glass frits are melted and permanently bonded to the glass surface. The temperature treatment is typically carried out at temperatures in the range from 450° C. to 700° C. The pigment remains as a masking strip in the glass matrix formed by the molten glass frits.

Alternatively, the first masking strip is an opaque, i.e., colored or pigmented, preferably black pigmented, thermoplastic composite film, preferably based on polyvinyl butyral (PVB), ethyl vinyl acetate (EVA), or polyethylene terephthalate (PET), preferably PVB. The coloring or pigmentation of the composite film can be freely selected, but is preferably black. The colored or pigmented composite film is preferably arranged between the outer pane and the inner pane and particularly preferably on the inner face of the outer pane. The colored or pigmented thermoplastic composite film preferably has a thickness of 0.25 mm to 1 mm.

If something is formed "based on" a material, it consists for the most part of this material, in particular substantially of this material in addition to any impurities or dopants.

According to another preferred embodiment of the composite pane according to the invention, in addition to the first masking strip on the inner face of the outer pane, at least one further masking strip is arranged on the outer face of the inner pane and/or on the inner face of the inner pane. The further masking strip serves to improve the adhesion of the outer pane and the inner pane and is preferably mixed with ceramic particles, which give the masking strip a rough and adhesive surface, which, for example, on the inner face of the inner pane, supports the bonding of the composite pane in the vehicle body. On the outer face of the inner pane, this supports the lamination of the two individual panes of the composite pane. A further masking strip applied on the inner face of the inner pane can also be provided for aesthetic reasons, for example, to conceal the edge of the reflection layer or to form the edge of the transition to the transparent region. The first and further masking strips preferably have a thickness of 5 μm to 50 μm, particularly preferably of 8 μm to 25 μm.

The light reflected by the reflection layer is preferably visible light, i.e., light in a wavelength range from approx. 380 nm to 780 nm. The reflection layer is thus suitable for reflecting visible light in a wavelength range from approx. 380 nm to 780 nm. The reflection layer preferably has high and uniform reflectance (at various angles of incidence) for p-polarized and/or s-polarized radiation such that a high-intensity, color-neutral image display is ensured.

The reflection layer is preferably partially transparent to light, meaning, in the context of the invention, that it has average transmittance (according to ISO 9050:2003) in the visible spectral range of preferably at least 60%, particularly preferably at least 70%, and in particular less than 85% and thus does not substantially restrict through-vision through the pane. The reflection layer preferably reflects at least 15%, particularly preferably at least 20%, most particularly preferably at least 30% of the light incident on the reflection layer. The reflection layer preferably reflects only p-polarized or s-polarized light. The reflection layer is intended to reflect light from an image display device.

The reflection layer can also be opaque. The reflection layer is preferably opaque when it is arranged congruent with the opaque region of the masking layer or the reflection layer completely overlaps the opaque region of the masking layer. The opaque reflection layer preferably reflects at least 60%, particularly preferably at least 70%, most particularly preferably at least 80% of the light incident on the reflection layer.

The reflection layer is suitably implemented to reflect light of an image display device. The reflection layer preferably reflects 30% or more, preferably 50% or more, most particularly 70% or more, and in particular 90% or more of the light from the image display device incident on the reflection layer.

In a preferred embodiment of the invention, the reflection layer preferably reflects 10% or more, preferably 50% or more, most particularly 70% or more, and in particular 90% or more of a p-polarized light.

The indication of the polarization direction refers to the plane of incidence of the radiation on the composite pane. The expression "p-polarized radiation" refers to radiation whose electric field oscillates in the plane of incidence. "S-polarized radiation" refers to radiation whose electric field oscillates perpendicular to the plane of incidence. The plane of incidence is generated by the vector of incidence and the surface normal of the composite pane in the geometric center of the irradiated region.

In other words, the polarization, i.e., in particular the proportion of p- and s-polarized radiation, is determined at one point of the region irradiated by the image display device, preferably in the geometric center of the irradiated region. Since composite panes can be curved (for example, when they are windshields), thus affecting the plane of incidence of the image display device radiation, slightly deviating polarization proportions can occur in the remaining regions, which is unavoidable for physical reasons.

The reflection layer preferably includes at least one metal selected from the group consisting of aluminum, tin, titanium, zirconium, hafnium, vanadium, niobium, tantalum, chromium, manganese, iron, cobalt, rhodium, iridium, nickel, palladium, platinum, copper, silver, gold, or mixed alloys thereof. The reflection layer particularly preferably contains aluminum or a nickel chromium alloy. In particular, the reflection layer consists of aluminum or a nickel chromium alloy. Aluminium and nickel chromium alloys have particularly high reflection for visible light.

In one particular embodiment of the invention, the reflection layer is a coating containing a thin-film stack, i.e., a layer sequence of thin individual layers. This thin-film stack contains one or more electrically conductive layers based on silver. The electrically conductive layer based on silver gives the reflection coating the basic reflecting properties and also an IR reflecting effect and electrical conductivity. The electrically conductive layer is based on silver. The conductive layer preferably contains at least 90 wt.-% silver, particularly preferably at least 99 wt.-% silver, most particularly preferably at least 99.9 wt.-% silver. The silver layer can have dopants, for example, palladium, gold, copper, or aluminum. Materials based on silver are particularly suitable for reflecting light, particularly preferably p-polarized light. The use of silver in reflection layers has proved to be particularly advantageous in the reflection of light. The coating has a thickness of 5 μm to 50 μm and preferably of 8 μm to 25 μm.

The reflection layer can also be implemented as a reflecting coated or uncoated film that reflects light, preferably p-polarized light. The reflection layer can be a carrier film with a reflecting coating or a reflecting polymer film. The reflecting coating preferably includes at least one layer based on a metal and/or a dielectric layer sequence with alternating refractive indices. The layer based on a metal preferably contains or is made of silver and/or aluminum. The dielectric layers can, for example, be based on silicon nitride, zinc oxide, tin zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminum, zirconium, titanium, or boron. The reflecting uncoated polymer film preferably includes or consists of dielectric polymer layers. The dielectric polymer layers preferably contain PET. If the reflection layer is implemented as a reflecting film, it is preferably from 30 μm to 300 μm thick, particularly preferably from 50 μm to 200 μm, and in particular from 100 μm to 150 μm.

If the reflection layer is implemented as a coating, it is preferably applied by physical vapor deposition (PVD) onto the inner pane or the outer pane, particularly preferably by cathodic sputtering ("sputtering"), and most particularly preferably by magnetron-enhanced cathodic sputtering ("magnetron sputtering"). In principle, however, the coating can, for example, also be applied by chemical vapor deposition (CVD), plasma-enhanced chemical vapor deposition (PECVD), by vapor deposition, or by atomic layer deposition (ALD). The coating is preferably applied to the panes prior to lamination.

If it is a coated reflecting film, CVD or PVD coating methods can also be used for production.

According to another preferred embodiment of the composite pane according to the invention, the reflection layer is implemented as a reflecting coated carrier film or an uncoated polymer film and arranged within the thermoplastic intermediate layer. The advantage of this arrangement is that the reflection layer does not have to be applied to the outer pane or inner pane using thin-film technology (for example, CVD and PVD). This results in uses of the reflection layer with further advantageous functions such as a more homogeneous reflection of the light on the reflection layer. In addition, the production of the composite pane can be simplified, since the reflection layer does not have to be arranged on the outer or inner pane via an additional process prior to lamination.

In a particularly preferred embodiment of the invention, the reflection layer is a reflecting film that is metal free and reflects visible light rays preferably with p-polarization. The reflection layer is a film that functions on the basis of prisms and reflecting polarizers acting synergistically with one another. Such films for use as reflection layers are commercially available, for example, from 3M Company.

In another preferred embodiment of the invention, the reflection layer is a holographic optical element (HOE). The term "HOE" refers to elements that are based on the operating principle of holography. HOEs change light in the beam path using information stored in the hologram usually as a change in the refractive index. Their function is based on the superposition of plane or spherical light waves whose interference pattern produces the desirable optical effect. HOEs are already used in the transportation sector, for example, in head-up displays. The advantage of using an HOE compared to simply reflecting layers results from a greater geometric design freedom in terms of the arrangement of eye and projector position as well as the respective angles of inclination, e.g., of the projector and reflecting layer. Furthermore, with this variant, double images are particularly strongly reduced or even prevented. HOEs are suitable for displaying real images or even virtual images in different image widths. Moreover, the geometric angle of reflection can be adjusted with the HOE such that, for example, in the case of an application in a vehicle, the information transmitted for the driver can be displayed very well from the desired viewing angle.

Advantageously, the reflection layer can improve the properties of the reflected light compared to mere reflection of the light at the pane. The proportion of the reflected p-polarized light is preferably high, with the reflectivity of light being, for example, approx. 90%.

In one particular embodiment of the invention, a high-refractive-index coating is applied to the entire inner face of the inner pane or to a region thereof. The high-refractive-index coating is preferably in direct spatial contact with the inner face of the inner pane. The high-refractive-index coating is arranged at least in a region on the inner face of the inner pane, which, when viewed through the composite pane, is in complete overlap with the reflection layer. The reflection layer is thus arranged spatially closer to the outer face of the outer pane, but spatially farther from the inner face of the inner pane than the high-refractive-index coating. This means that light with preferably a majority proportion of p-polarized light projected by the image display device onto the reflection layer passes through the high-refractive-index coating before striking the reflection layer.

The high-refractive-index coating has a refractive index of at least 1.7, particularly preferably at least 1.9, most particularly preferably at least 2.0. The increase in the refractive index brings about a high-refractive effect. The high-refractive-index coating causes a weakening of the reflection of light and, in particular, p-polarized light at the interior-side surface of the inner pane such that the desired reflection of the reflection coating appears with greater contrast.

According to an explanation by the inventors, the effect is based on the increase in the refractive index of the interior-side surface as a result of the high-refractive-index coating. This increases Brewster's angle $\alpha_{Brewster}$ at the interface, since this is known to be determined as $\alpha_{Brewster}=\arctan(n_2/n_1)$, where $n_1$ is the refractive index of air and $n_2$ is the refractive index of the material that the radiation strikes. The high-refractive-index coating with the high refractive index results in an increase in the effective refractive index of the glass surface and thus in a shift of Brewster's angle to larger values compared to an uncoated glass surface. As a result, with common geometric relations of projection assemblies based on HUD technology, the difference between the incident angle and Brewster's angle becomes smaller such that the reflection of the p-polarized light at the inner face of the inner pane is suppressed and the ghost image generated thereby is weakened.

The high-refractive-index coating is preferably formed from a single layer and has no further layers above or below this layer. A single layer is sufficient to achieve a good effect and is technically simpler than applying a layer stack. In principle, however, the high-refractive-index coating can also comprise multiple individual layers, which can be desirable for optimizing certain parameters in the individual case.

Suitable materials for the high-refractive-index coating are silicon nitride ($Si_3N_4$), a mixed silicon-metal nitride (for example, silicon-zirconium nitride (SiZrN), mixed silicon-aluminum nitride, mixed silicon-hafnium nitride, or mixed silicon-titanium nitride), aluminum nitride, tin oxide, manganese oxide, tungsten oxide, niobium oxide, bismuth oxide, titanium oxide, mixed tin-zinc oxide, and zirconium oxide. In addition, transition metal oxides (such as scandium oxide, yttrium oxide, tantalum oxide) or lanthanide oxides (such as lanthanum oxide or cerium oxide) can also be used. The high-refractive-index coating preferably contains one or more of these materials or is based thereon.

The high-refractive-index coating can be applied by physical or chemical vapor deposition, i.e., can be a PVD or CVD coating (PVD: physical vapor deposition, CVD: chemical vapor deposition). Suitable materials on which the coating is preferably based are in particular silicon nitride, a mixed silicon-metal nitride (for example, silicon-zirconium nitride, mixed silicon-aluminum nitride, mixed silicon-hafnium nitride, or mixed silicon-titanium nitride), aluminum nitride, tin oxide, manganese oxide, tungsten oxide, niobium oxide, bismuth oxide, titanium oxide, zirconium oxide, zirconium nitride, or mixed tin-zinc oxide. Preferably, the high-refractive-index coating is a coating applied by cathodic sputtering ("sputtered"), in particular a coating applied by magnetron-enhanced cathodic sputtering ("magnetron sputtered").

Alternatively, the high-refractive-index coating is a sol-gel coating. In the sol-gel method, first, a sol containing the precursors of the coating is provided and ripened. The ripening can involve hydrolysis of the precursors and/or a (partial) reaction between the precursors. The precursors are usually present in a solvent, preferably water, alcohol (in particular, ethanol), or a water-alcohol mixture. In this case, the sol preferably contains silicon oxide precursors in a solvent. The precursors are preferably silanes, in particular tetraethoxysilanes or methyltriethoxysilane (MTEOS).

Alternatively, however, silicates can also be used as precursors, in particular sodium, lithium, or potassium silicates, for example, tetramethyl orthosilicate, tetraethyl orthosilicate (TEOS), tetraisopropyl orthosilicate, or organosilanes of the general form R2nSi(OR1)4-n. Here, R1 is preferably an alkyl group; R2 is an alkyl, epoxy, acrylate, methacrylate, amine, phenyl, or vinyl group; and n is an integer from 0 to 2. Silicon halides or alkoxides can also be used. The silicon oxide precursors result in a sol-gel coating of silicon oxide. In order to increase the refractive index of the coating to the value according to the invention, refractive-index-enhancing additives, preferably titanium oxide and/or zirconium oxide, or their precursors, are added to the sol. In the finished coating, the refractive-index-enhancing additives are present in a silicon oxide matrix. The molar ratio of silicon oxide to refractive-index-enhancing additives can be selected freely as a function of the desired refractive index and is, for example, around 1:1.

In another particular embodiment of the invention, the high-refractive-index coating is applied regionally on the further masking strip, with the further masking strip being applied to the inner face of the inner pane. In this context, the word "regionally" means that the high-refractive-index coating is arranged partially or completely on the further masking strip, but, in addition, can also be applied on the inner face of the inner pane. This has the advantage that the high-refractive-index layer can be applied to the entire inner pane, regardless of whether a masking strip was previously applied to the inner pane.

Preferably, a further electrically conductive coating is applied at least regionally on the outer face of the inner pane or the inner face of the outer pane.

The electrically conductive coating can extend over the entire outer face of the inner pane or the entire inner face of the outer pane. The electrically conductive coating preferably extends over at least 50%, particularly preferably over at least 70%, and most particularly preferably over at least 90% of the outer face of the inner pane or the inner face of the outer pane.

The electrically conductive coating can be applied spatially directly on the inner pane or the outer pane, the reflection layer, or the masking strip. Alternatively, the electrically conductive coating can be applied to a carrier film that is bonded to the outer pane or the inner pane.

The electrically conductive coating typically contains one or more, for example, two, three, or four, electrically conductive functional layers. The functional layers preferably contain at least one metal, for example, silver, gold, copper, nickel, and/or chromium or a metal alloy. The functional layers particularly preferably contain at least 90 wt.-% of the metal, in particular at least 99.9 wt.-% of the metal. The functional layers can consist of the metal or the metal alloy. The functional layers particularly preferably contain silver or a silver-containing alloy. Such functional layers have particularly advantageous electrical conductivity with, at the same time, high transmittance in the visible spectral range. The thickness of a functional layer is preferably from 5 nm to 50 nm, particularly preferably from 8 nm to 25 nm. In this range for the thickness of the functional layer, advantageously high transmittance in the visible spectral range and particularly advantageous electrical conductivity are achieved.

Preferably, at least one dielectric layer is, in each case, arranged between two adjacent functional layers of the coating. Preferably, a further dielectric layer is arranged below the first and/or above the last functional layer. A dielectric layer contains at least one single layer of a dielectric material, for example, containing a nitride such as silicon nitride or an oxide such as aluminum oxide. Dielectric layers can, however, also include multiple individual layers, for example, individual layers of a dielectric material, smoothing layers, matching layers, blocking layers, and/or antireflection layers. The thickness of a dielectric layer is, for example, from 10 nm to 200 nm.

This layer structure is generally obtained by a sequence of deposition operations carried out by a vacuum process such as magnetron-enhanced cathodic sputtering.

Other suitable electrically conductive coatings preferably contain indium tin oxide (ITO), fluorine-doped tin oxide ($SnO_2$:F), or aluminum-doped zinc oxide (ZnO:Al). The functional layers preferably have a layer thickness of 8 nm to 25 nm, particularly preferably of 13 nm to 19 nm. This is particularly advantageous in terms of the transparency, color neutrality, and sheet resistance of the electrically conductive coating.

In an advantageous embodiment, the electrically conductive coating is a layer or a layer structure of multiple individual layers with a total thickness less than or equal to 2 µm, particularly preferably less than or equal to 1 µm.

The total layer thickness of all electrically conductive layers is preferably from 40 nm to 80 nm, particularly preferably from 45 nm to 60 nm. In this range for the total thickness of all electrically conductive layers, sufficiently high specific heating power P and, at the same time, sufficiently high transmittance are advantageously achieved with typical distances h between two bus bars and an operating voltage U in the range from 12 V to 15 V for vehicle panes, in particular windshields. In addition, the electrically conductive coating has, in this range for the total thickness of all electrically conductive layers, particularly good reflecting properties for the infrared range. Excessively low total layer thicknesses of all electrically conductive layers result in an excessively high sheet resistance $R_{square}$ and thus in excessively low specific heating power P as well as reduced reflecting properties for the infrared range. Excessively large total layer thicknesses of all electrically conductive layers reduce transmittance through the pane too much such that the requirements for transmittance of vehicle windows are not met.

In a preferred embodiment of the invention, the electrically conductive coating is implemented in the form of thin metal wires that preferably run from one edge region of the inner or the outer pane to the respective opposite edge region of the inner or the outer pane. The wires can even overlap. The diameter of the metal wires is preferably less than 0.5 mm. The metal wires preferably contain at least one metal, for example, silver, gold, copper, nickel, and/or chromium or a metal alloy. The metal wires particularly preferably contain at least 90 wt.-% of the metal, in particular at least 99.9 wt.-% of the metal. Metal wires as the embodiment of the coating are particularly suitable in applications in which the electrically conductive coating is to be heated via a heating current.

Notwithstanding an IR-reflecting effect of the heating coating, the coating can also be used to heat the composite pane. For this purpose, preferably at least two outer bus bars provided for connection to a voltage source are connected to the electrically conductive coating such that a current path for a heating current is formed between the bus bars. As a result of the heating of the composite pane via the electrically conductive coating, the heating variant using the heating, ventilation, and air conditioning (HVAC) method typically used when the composite pane is installed in a vehicle is superfluous. This enables further space reduction in the region of the dashboard. Heating using HVAC requires supply lines that direct the air, usually heated in the engine compartment, to the composite pane. These supply lines are usually installed in the dashboard of a vehicle and require a great deal of space. However, electric heating of the electrical coating is also advantageous with respect to use in electric vehicles. In electric vehicles, heating the windshield via the electrically conductive coating means energy savings compared to the electrical heating of air that is directed at the composite pane. Furthermore, there are degrees of freedom in design since the air outlets of HVAC systems have to be positioned in a defined geometric arrangement relative to the glass surface to enable the blower function. Use of electrically conductive coatings eliminates such boundary conditions and the dashboard can be arranged more freely.

The electrically conductive coating of the composite pane according to the invention preferably has sheet resistance less than or equal to 1 ohm/square, particularly preferably from 0.4 ohm/square to 0.9 ohm/square, most particularly preferably from 0.5 ohm/square to 0.85 ohm/square, for example, approx. 0.7 ohm/square. In this range for the sheet resistance, high specific heating powers P are advantageously achieved. In addition, in this range for the sheet resistance, the electrically conductive coating has particularly good reflecting properties for the infrared range.

In a particular embodiment of the invention, the electrically conductive coating is connected in an edge region of the outer pane or the inner pane to two bus bars provided for connection to a voltage source such that a current path for a heating current is formed between the bus bars. In this context, the electrically conductive coating preferably extends over 90% or more of the outer pane or the inner pane. This arrangement allows most of the composite pane to be heated efficiently.

In another particular embodiment of the invention, the electrically conductive coating is arranged in complete overlap with the first masking strip and is connected to two bus bars provided for connection to a voltage source such that a current path for a heating current is formed between the bus bars. Preferably, the electrically conductive coating is applied on the masking strip. In another possibility, the masking strip is applied on the electrically conductive coating. In this variant, the region that coincides with the first masking strip can be selectively heated.

The bus bars can be implemented as printed and baked conductive structures. The printed bus bars preferably contain at least a metal, a metal alloy, a metal compound, and/or carbon, particularly preferably a noble metal, and in particular silver. The printing paste preferably contains metallic particles, metal particles, and/or carbon and in particular noble metal particles such as silver particles. The electrical conductivity is preferably achieved through the electrically conductive particles. The particles can be situated in an organic and/or inorganic matrix such as pastes or inks, preferably as a printing paste with glass frits.

The layer thickness of the printed bus bars is preferably from 5 µm to 40 µm, particularly preferably from 8 µm to 20 µm, and most particularly preferably from 8 µm to 12 µm. Printed bus bars with these thicknesses are technically easy to realize and have advantageous current carrying capacity.

The width of the bus bars is preferably from 2 mm to 30 mm, particularly preferably from 4 mm to 20 mm, and in particular from 10 mm to 20 mm. Thinner bus bars result in excessively high electrical resistance and thus in excessively high heating of the bus bars during operation. Furthermore, thinner bus bars are difficult to produce by printing techniques such as screen-printing. Thicker bus bars require undesirably high use of material.

The specific resistance pa of the bus bars is preferably from 0.8 µohm·cm to 7.0 µohm·cm and particularly preferably from 1.0 µohm·cm to 2.5 µohm·cm. Bus bars with specific resistances in this range are technically easy to realize and have advantageous current-carrying capacity.

Alternatively, however, the bus bars can also be implemented as strips of an electrically conductive foil. The bus bars then contain, for example, at least aluminum, copper, tinned copper, gold, silver, zinc, tungsten, and/or tin or alloys thereof. The strips preferably have a thickness of 10 µm to 500 µm, particularly preferably of 30 µm to 300 µm. Bus bars made of electrically conductive foils with these thicknesses are technically easy to realize and have advantageous current carrying capacity. The strips can be electrically conductively connected to the electrically conductive structure, for example, via a solder compound, via an electrically conductive adhesive, or by direct placement.

In another particular embodiment of the invention, the electrically conductive coating is arranged on the entire inner face of the outer pane or the entire outer face of the inner pane minus the circumferential edge region of the outer pane or the inner pane, preferably with a width of 5 mm to 100 mm and particularly preferably of 10 mm to 50 mm. In the installed position in a vehicle, the uncoated region thus created (i.e., the edge region without electrically conductive coating) serves for electrical insulation between the electrically conductive coating and the vehicle body.

The outer pane and the inner pane preferably contain or are made of glass, particularly preferably flat glass, float glass, quartz glass, borosilicate glass, soda lime glass, aluminosilicate glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof.

The outer pane and the inner pane can have further suitable coatings known per se, for example, antireflection coatings, nonstick coatings, scratch-resistant coatings, photocatalytic coatings, or sun-shading coatings or low-E coatings.

The thickness of the individual panes (outer pane and inner pane) can vary widely and be adapted to the requirements of the individual case. Preferably, panes with the standard thicknesses from 0.5 mm to 5 mm and preferably from 1.0 mm to 2.5 mm are used. The size of the panes can vary widely and is governed by the use.

The composite pane can have any three dimensional shape desired. Preferably, the outer pane and the inner pane have no shadow zones such that they can, for example, be coated by cathodic sputtering. Preferably, the outer pane and the inner pane are flat or slightly or strongly curved in one or a plurality of spatial directions.

The thermoplastic intermediate layer contains or is made of at least one thermoplastic, preferably polyvinyl butyral (PVB), ethylene vinyl acetate (EVA), and/or polyurethane (PU) or copolymers or derivatives thereof, optionally in combination with polyethylene terephthalate (PET). The thermoplastic intermediate layer can, however, also contain, for example, polypropylene (PP), polyacrylate, polyethylene (PE), polycarbonate (PC), polymethyl methacrylate, polyvinyl chloride, polyacetate resin, casting resin, acrylate, fluorinated ethylene-propylene, polyvinyl fluoride, and/or ethylene tetrafluoroethylene, or a copolymer or mixture thereof.

The thermoplastic intermediate layer is preferably implemented as at least one thermoplastic composite film and contains or is made of polyvinyl butyral (PVB), particularly preferably of polyvinyl butyral (PVB) and additives known to the person skilled in the art, such as plasticizers. Preferably, the thermoplastic intermediate layer contains at least one plasticizer.

Plasticizers are chemical compounds that make plastics softer, more flexible, smoother, and/or more elastic. They shift the thermoelastic range of plastics to lower temperatures such that the plastics have the desired more elastic properties in the range of the temperature of use. Preferred plasticizers are carboxylic acid esters, in particular low-volatility carboxylic acid esters, fats, oils, soft resins, and camphor. Other plasticizers are preferably aliphatic diesters of tri- or tetraethylene glycols. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol-bis-(2-ethyl hexanoate), in other words, a compound of the formula $C_4H_9CH(CH_2CH_3)CO(OCH_2CH_2)_3O_2CCH(CH_2CH_3)C_4H_9$.

Preferably, the thermoplastic intermediate layer based on PVB contains at least 3 wt.-%, preferably at least 5 wt.-%, particularly preferably at least 20 wt.-%, even more preferably at least 30 wt.-%, and in particular at least 35 wt.-% of a plasticizer. The plasticizer preferably contains or is made of triethylene glycol-bis-(2-ethyl hexanoate).

The thermoplastic intermediate layer can be formed by a single film or, also, by more than one film. The thermoplastic intermediate layer can be formed by one or more thermoplastic films arranged one above another, with the thickness of thermoplastic intermediate layer preferably being from 0.25 mm to 1 mm, typically 0.38 mm or 0.76 mm.

The thermoplastic intermediate layer can also be a functional thermoplastic intermediate layer, in particular an intermediate layer with acoustically damping properties, an infrared-radiation-reflecting intermediate layer, an infrared-radiation-absorbing intermediate layer, and/or a UV-radiation-absorbing intermediate layer. For example, the thermoplastic intermediate layer can also be a band filter film that blocks out narrow bands of visible light.

The invention further extends to a projection assembly comprising a composite pane according to the invention and an image display device associated with the reflection layer. The image display device comprises an image display directed at the reflection layer, the image of which is reflected by the reflection layer, and this subsequently leaves the composite pane according to the invention preferably via the inner face of the inner pane, wherein at least the region of the reflection layer that is in overlap with the first masking strip is irradiated by the image display device. If multiple reflection layers are arranged offset from one another in their extension, a corresponding number of image display devices can be provided.

In a particular embodiment of the invention, in addition to the region that is in overlap with the first masking strip, the reflection layer also extends over a region that does not overlap with the first masking strip. In this case, the projection assembly includes a further image display device, the image of which is reflected by the reflection layer, and this subsequently leaves the composite pane according to the invention via the inner face of the inner pane, wherein a section of the reflection layer is irradiated by the further image display device, which is situated in the region that does not overlap with the first masking strip. The advantage of this application is the availability of a reflected image with high contrast where the reflection layer is in overlap with the first masking strip. The image of the further image display device is reflected in a region that is preferably transparent in through-vision through the composite pane, thus creating a conventional head-up display image as used in vehicles.

In the context of the invention, the expression "region that does not overlap with the first masking strip" means that, in through-vision through the composite pane, this region does not overlap with the first masking strip.

According to a preferred embodiment of the projection assembly according to the invention, the image display, which can also be referred to as display, can be implemented as a liquid crystal display (LCD), thin-film transistor display (TFT), light-emitting diode display (LED), organic light-emitting diode display (OLED), electroluminescent display (EL), microLED display, or the like, preferably as an LCD display. Due to the high reflection of p-polarized light, energy-intensive projectors, such as those usually used in head-up display applications, are not necessary. The display variants mentioned and other similar energy-saving image display devices are sufficient. As a result, energy consumption and heat dissipation can be reduced.

In another preferred embodiment of the invention, the projection assembly includes a field-of-view camera which is intended to capture the field of view of a user, and which interacts with the image display device and the composite pane such that, visually, the user can optimally detect the image reflected via the reflection layer.

The field-of-view camera includes at least an eye camera and an infrared light source. The field-of-view camera operates on the basis of the "remote eye tracker" principle. Consequently, when the projection assembly according to the invention is installed in a vehicle, the field-of-view camera can be mounted in the dashboard region or on the composite pane. The infrared light source emits an infrared light that the eye camera detects via the reflection on the eye of the user and can thus track the position of the eyes. The data thus obtained concerning the user's eye position are evaluated and can lead to an adjustment of the orientation of the image display device. The change in the orientation of the image display device is governed by the user's eye position and results in angle changes in the reflection of the image on the reflection layer. The reflected image thus strikes the user's eyes at an improved angle, enabling better visual perception of the image.

In another preferred embodiment of the invention, the projection assembly includes a functional element that is intended to detect freehand movements of the user and that interacts with the image display device such that information that can be used to control the image display device can be obtained from the freehand movements of the user.

The functional element can contain one or more optical sensors capable of creating a 3D image of a defined region. From the 3D image, for example, movements, gestures, or approaches can be detected and used to control and monitor image displays that are made visually accessible to the user via the reflection on the reflection layer. The functional element is connected to an evaluation unit for detecting movement and/or presence of body parts of individuals.

In a particular embodiment of the invention, the optical sensor radiates and detects in a frequency range of preferably at least 300 GHz and particularly preferably in the infrared-light frequency range. Infrared-light systems for recognition of hand signals or gestures have already been extensively researched and are, consequently, particularly suitable for commercial use.

In a further particular embodiment of the invention, the optical sensor radiates and detects in a frequency range of preferably at most 300 GHz. Lower-frequency beams are particularly suitable for detecting movements and gestures because they are less subject to radiation pollution in the form of light beams in the visible or infrared range.

Alternatively, the functional element can contain multiple capacitive sensors. The capacitive sensors form switching regions that can be formed by a surface electrode or by an arrangement of two coupled electrodes. When an object approaches the capacitive switching region, the capacitance of the surface electrodes to ground or the capacitance of the capacitor formed by the two coupled electrodes is changed. The change in capacitance is measured by a circuit arrangement or sensor electronics and a switching signal is triggered when a threshold value is exceeded. The switching signal thus triggered can be used to operate the image display device electrically connected to the functional element. Movements at a closer distance of preferably up to 15 cm, in particular of up to 10 cm, can be particularly readily detected. By activating different switching signals in a specific order, it is also possible to detect the direction of the movement. In this way, image displays that are made visually accessible to the user via the reflection on the reflection layer can be controlled and monitored.

The functional element and/or the field-of-view camera are preferably attached to the composite pane according to the invention, but can also be arranged within the composite pane, i.e., between the outer pane and the inner pane. Arrangement on the inner face of the outer pane as well as the outer face of the inner pane is likewise possible. Alternatively, when the projection assembly according to the invention is installed in a vehicle, the functional element and/or the field-of-view camera is attached to the dashboard region.

The invention further extends to a method for producing a composite pane according to the invention. The method comprises the following steps:
  (a) In a first step, an outer pane, an inner pane, and a thermoplastic intermediate layer are provided, wherein the outer and the inner pane have in each case an outer face and an inner face.
  (b) In a second step, a first masking strip is arranged regionally on one of the outer faces or inner faces of the inner or the outer pane.
  (c) In a third step, an electrically conductive coating is applied.
  (d) In a fourth step, the thermoplastic intermediate layer is arranged between the outer pane and the inner pane such that a layer stack is formed, with the inner face of the outer pane and the outer face of the inner pane facing one another. A reflection layer is always arranged spatially in front of the first masking strip when viewed from the inner pane toward the outer pane, with the first masking strip in overlap with a reflection layer at least in one region. The reflection layer is suitably designed to reflect light.
  (e) In a fifth step, the layer stack is laminated to form a composite pane.

The steps are preferably carried out in the order shown (from (a) to (d)). However, the second and third steps can be carried out in a different order.

The layer stack is laminated under the action of heat, vacuum, and/or pressure, wherein the individual layers are joined to one another (laminated) by at least one thermoplastic intermediate layer. Methods known per se can be used to produce a composite pane. For example, so-called autoclave methods can be carried out at an elevated pressure of approx. 10 bar to 15 bar and temperatures from 130° C. to 145° C. for roughly 2 hours. Vacuum bag or vacuum ring methods known per se operate, for example, at roughly 200 mbar and 130° C. to 145° C. The outer pane, the inner pane, and thermoplastic intermediate layer can also be pressed in a calender between at least one pair of rollers to form a composite pane. Facilities of this type for producing composite panes are known and normally have at least one heating tunnel upstream from a press. The temperature during the pressing operation is, for example, from 40° C. to 150° C. Combinations of calendering and autoclave methods have proved particularly useful in practice. Alternatively, vacuum laminators can be used. These consist of one or more heatable and evacuable chambers in which the outer pane and the inner pane can be laminated within, for example, about 60 minutes at reduced pressures from 0.01 mbar to 800 mbar and temperatures from 80° C. to 170° C.

The invention further extends to the use of the composite pane according to the invention in locomotion means for traffic on land, in the air, or on water, in particular in motor vehicles, wherein the composite pane can, for example, be used as a windshield, rear window, side windows, and/or a glass roof, preferably as a windshield. Preferably, the use of the composite pane is as a vehicle windshield.

The various embodiments of the invention can be implemented individually or in any combinations. In particular, the features mentioned above and to be explained below can be used not only in the combinations indicated but also in other combinations or in isolation without departing from the scope of the present invention.

Figure 1B:
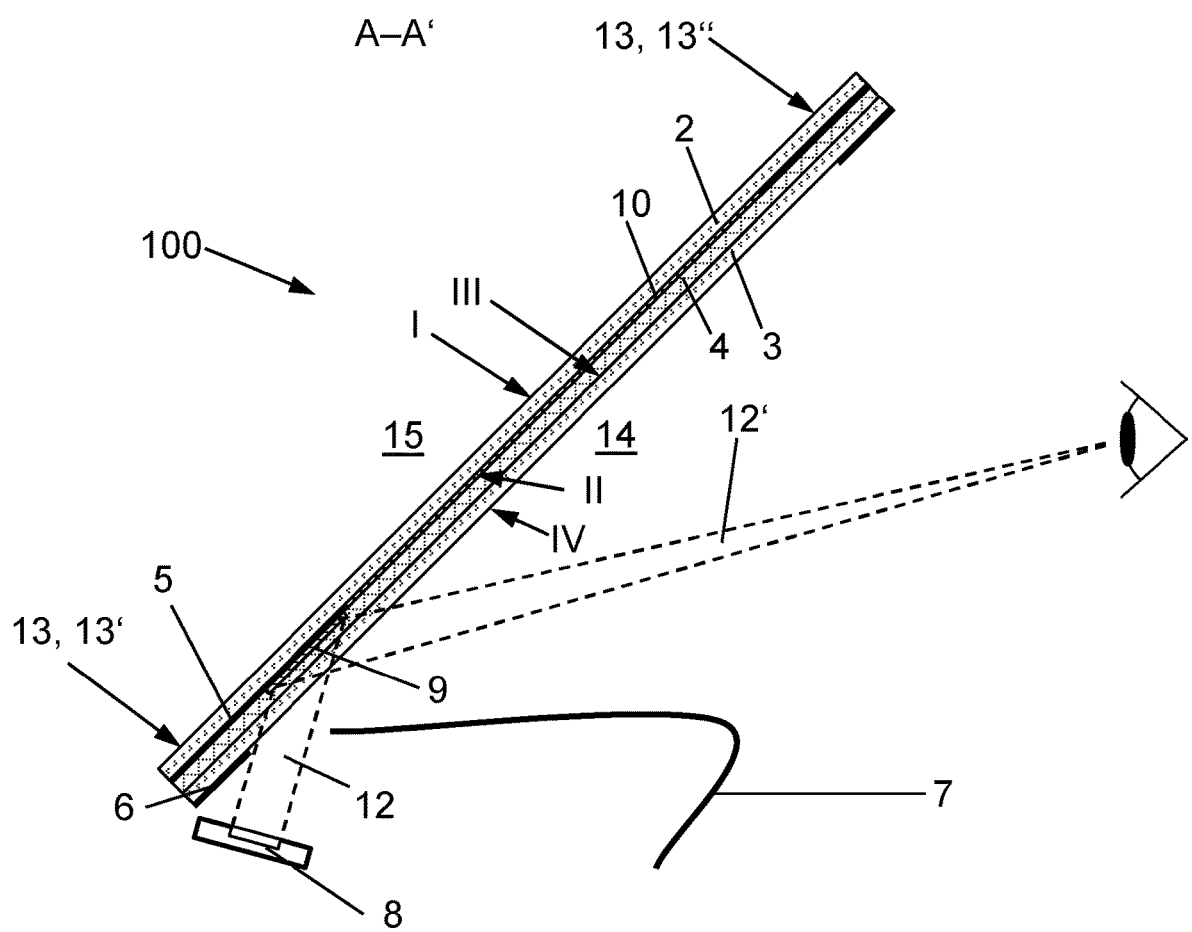
Figure 2:
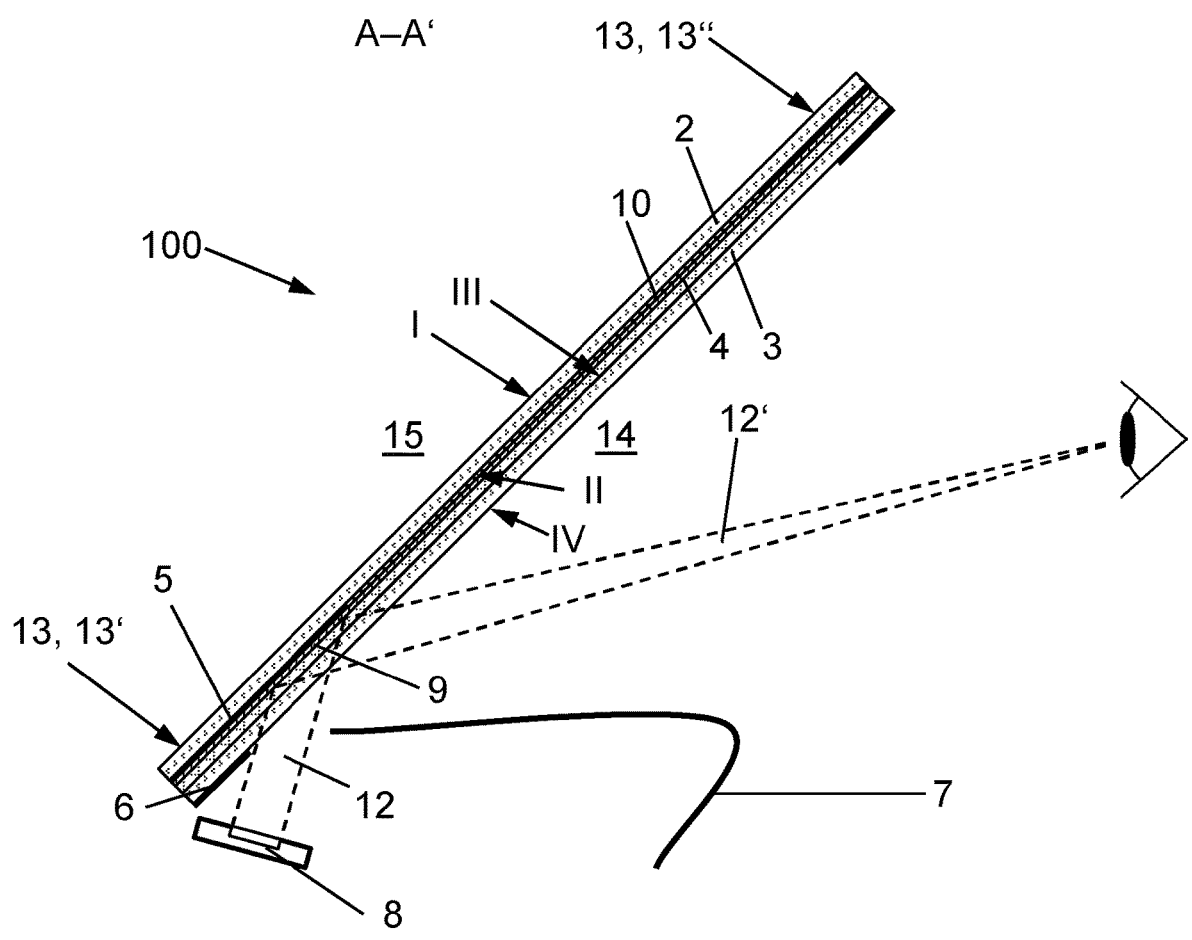
Figure 3:
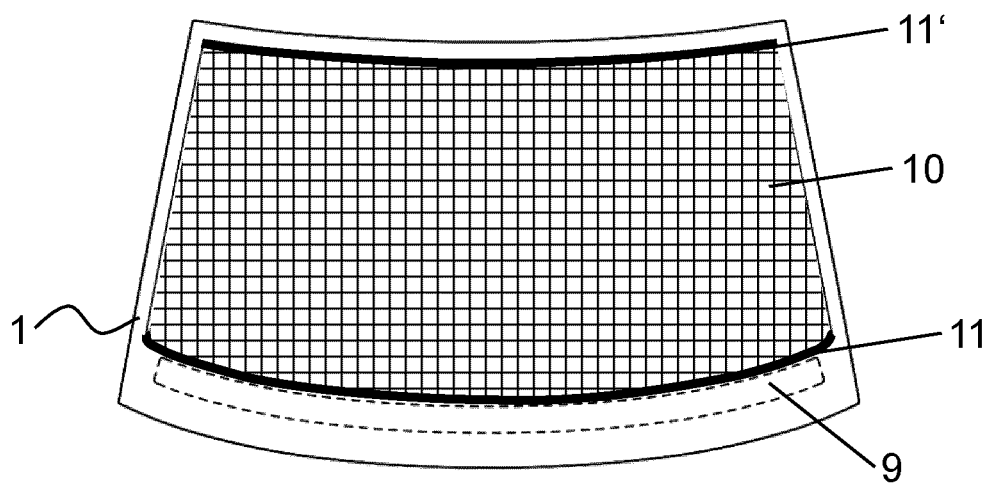
Figure 4:
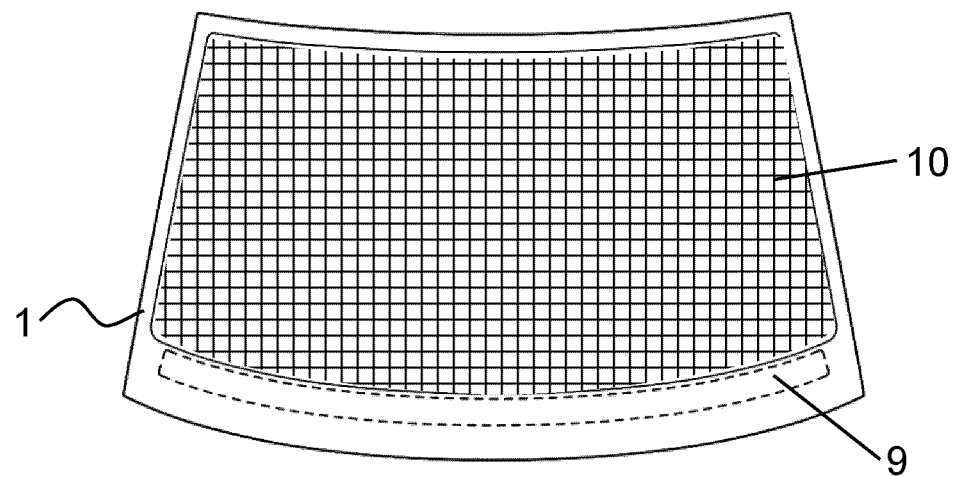

The invention is explained in greater detail in the following using exemplary embodiments with reference to the accompanying figures. They depict, in simplified representation, not to scale:

FIG. 1A a plan view of an embodiment of the composite pane according to the invention, FIG. 1B a cross-sectional view of a projection assembly according to the invention with the composite pane of FIG. 1, FIG. 2 another cross-sectional view of a projection assembly according to the invention with the composite pane, FIG. 3-4 a plan view of further embodiments of the composite pane according to the invention, and FIG. 5-10 enlarged cross-sectional views of various embodiments of the projection assembly according to the invention.

FIG. 1A depicts a plan view of an embodiment of the composite pane 1 according to the invention in a vehicle in a highly simplified, schematic representation. FIG. 1B depicts a cross-sectional view of the exemplary embodiment of FIG. 1A in the projection assembly 100. The cross-sectional view of FIG. 1B corresponds to the section line A-A' of the composite pane 1, as indicated in FIG. 1A.

The composite pane 1 is implemented in the form of a composite pane (cf. FIGS. 5-10) and comprises an outer pane 2 and an inner pane 3 with a thermoplastic intermediate layer 4, which is arranged between the outer and the inner pane 2, 3. The composite pane 1 is, for example, installed in a vehicle and separates a vehicle interior 14 from external surroundings 15. The composite pane 1 is, for example, the windshield of a motor vehicle.

The outer pane 2 and the inner pane 3 are made in each case of glass, preferably thermally toughened soda lime glass and are transparent to visible light. The thermoplastic intermediate layer 4 consists of a thermoplastic, preferably polyvinyl butyral (PVB), ethylene vinyl acetate (EVA), and/or polyethylene terephthalate (PET).

The outer face I of the outer pane 2 faces away from the thermoplastic intermediate layer 4 and is, at the same time, the outer surface of the composite pane 1. The inner face II of the outer pane 2 and the outer face III of the inner pane 3 face the intermediate layer 4 in each case. The inner face IV of the inner pane 3 faces away from the thermoplastic intermediate layer 4 and is, at the same time, the inner face of the composite pane 1. It goes without saying that the composite pane 1 can have any suitable geometric shape and/or curvature. As a composite pane 1, it typically has convex curvature. The composite pane 1 also has an upper edge situated at the top in the installed position and a lower edge situated at the bottom in the installed position as well as side edges situated on the left and the right.

In an edge region 13 of the composite pane 1, there is a frame-like circumferential first masking strip 5 on the inner face II of the outer pane 2. The first masking strip 5 is opaque and prevents the viewing of structures arranged to the inside of the composite pane 1, for example, an adhesive bead for gluing the composite pane 1 into a vehicle body. The first masking strip 5 is preferably black. The first masking strip 5 is made of an electrically nonconductive material conventionally used for masking strips, for example, a black colored screen printing ink that is baked.

Furthermore, as shown in FIG. 1B, the composite pane 1 has, in the edge region 13 on the inner face IV of the inner pane 3, a second masking strip 6. The second masking strip 6 is implemented circumferentially in a frame-like manner. Like the first masking strip 5, the second masking strip 6 is made of an electrically nonconductive material conventionally used for masking strips, for example, a black colored screen printing ink that is baked.

Situated in a central region of the composite pane 1, there is an electrically conductive coating on the inner face II of the outer pane 2. In plan view of the composite pane 1, the electrically conductive coating 10 is arranged approx. within the circumferential frame formed by the first masking strip 5. However, unlike what is shown here, it can also extend beyond this and be applied regionally or completely on the first masking strip 5 or the inner face II of the outer pane 2. The electrically conductive coating 10 is transparent and does not obstruct or only slightly obstructs the view through the composite pane 1. The edge region 13 of the composite pane 1 is not coated with the electrically conductive coating 10; this serves for electrical insulation between the electrically conductive coating 10 and the vehicle body. Alternatively, the electrically conductive coating 10 can also be arranged on the outer face III of the inner pane 3 in the central region.

As depicted in FIG. 1A, for the electrical contacting of the electrically conductive coating 10, in each case, a first bus bar 11 is arranged in the left edge region and another, second bus bar 11' is arranged in the right edge region on the electrically conductive coating 10 (not visible in FIG. 1B). The bus bars 11, 11' contain, for example, silver particles and were applied by screen printing and subsequently baked. The length of the bus bars 11, 11' corresponds approx. to the extent of the electrically conductive coating 10 along the side edges of the composite panel.

When an electrical voltage is applied to the bus bars 11, 11', a uniform current flows through the electrically conductive coating 10 between the bus bars 11, 11'. On each bus bar 11, 11', a connection to a supply line can be arranged approx. centrally (not shown here). The connection can be electrically connected to the bus bar via a contact surface. Via the electrical connections, the bus bars 11, 11' are connected, for example, to a voltage source, which provides an on-board voltage customary for motor vehicles, preferably from 12 V to 15 V and, for example, approx. 14 V. Alternatively, the 14-V voltage source can also have higher voltages, for example, from 35 V to 45 V and in particular 42 V. The electrically conductive coating 10 is, for example, a layer system, which contains, for example, three electrically conductive silver layers, which are separated from one another by dielectric layers. When a current flows through the electrically conductive coating 10, it is heated as a result of its electrical resistance and the development of Joule heat. This heat can be used to protect the composite pane 1 against icing or fogging.

As an alternative to this embodiment and to the embodiments in FIGS. 3 and 4, the electrically conductive coating 10 and, if present, the bus bars 11, 11' can also be arranged on the outer face III of the inner pane 3, analogously to the example depicted here.

On the first masking strip 5, there is a reflection layer 9 that is vapor deposited by means of a PVD method. When viewed through the composite pane 1, the reflection layer 9 does not overlap the second masking strip 6. The reflection layer 9 is, for example, a metal coating that contains at least one thin-layer stack with at least one silver layer and one dielectric layer. Alternatively, the reflection layer 9 can also be implemented as a reflecting film and be arranged on the first masking strip 5, for example, by means of an adhesive layer. The reflecting film can include a metal coating or, however, consist of dielectric polymer layers in a layer sequence. Combinations of these variants are also possible.

When viewed through the composite pane 1, the reflection layer 9 is arranged in overlap with the first masking strip 5, with the first masking strip 5 completely overlapping the reflection layer 9, i.e., the reflection layer 9 has no section that is not in overlap with the first masking strip 5. Here, the reflection layer 9 is, for example, arranged only in the lower (engine-side) section 13' of the edge region 13 of the composite pane 1. However, it would also be possible to arrange the reflection layer 9 in the upper (roof-side) section 13" or in a lateral section of the edge region 13. Furthermore, a plurality of reflection layers 9 can be provided, arranged, for example, in the lower (engine-side) section 13' and in the upper (roof-side) section 13" of the edge region 13. For example, the reflection layers 9 could be arranged such that a (partially) circumferential image is generated.

The first masking strip 5 is widened in the lower (engine-side) section 13' of the edge region 13, i.e., the first masking strip 5 has, in the lower (engine-side) section 13' of the edge region 13, a greater width than in the upper (roof-side) section 13" of the edge region 13 of the composite pane 1. "Width" means the dimension of the first masking strip 5 perpendicular to its extension. The second masking strip 6 is not arranged widened in the lower (engine-side) section 13' (i.e., also not in overlap with the reflection layer 9).

The projection assembly 100 further has an image display device 8 as an image generator arranged in the dashboard 7. The image display device 8 is used to generate light 12 (image information) that is directed at the reflection layer 9 and is reflected by the reflection layer 9 as reflected light 12' into the vehicle interior 14, where it can be seen by a viewer, e.g., driver. The reflection layer 9 is suitably implemented to reflect the light 12 of the image display device 8, i.e., an image of the image display device 8. The light 12 of the image display device 8 preferably strikes the composite pane 1 at an angle of incidence from 50° to 80°, in particular from 60° to 70°, typically roughly 65°, as is customary with HUD projection assemblies. It would also be possible, for example, to arrange the image display device 8 in the A-pillar of a motor vehicle or on the roof (inside the vehicle interior in each case), provided the reflection layer 9 is suitably positioned for this. When multiple reflection layers 9 are provided, a separate image display device 8 can be associated with each reflection layer 9, i.e., multiple image display devices 8 can be arranged. The image display device 8 is, for example, a display, such as an LCD display, OLED display, EL display, or μLED display. It would also be possible, for example, for the composite panel 1 to be a roof panel, side window, or rear window of a vehicle.

The variant depicted in FIG. 2 corresponds essentially to the variant of FIGS. 1A and 1B such that here only the differences are discussed and, otherwise, reference is made to the description concerning FIGS. 1A and 1B.

Unlike what is shown in FIGS. 1A and 1B, when viewed through the composite pane 1, the reflection layer 9 is in overlap with the entire inner face II of the outer pane 2. Thus, when viewed through the composite pane 1, the reflection layer 9 is completely in overlap with the first masking strip 5 and the electrically conductive coating 10. The reflection layer 9 is vapor deposited onto the first masking strip 5 and the electrically conductive coating 10, for example, using the PVD method. However, it is equally possible for the entire reflection layer 9 to be applied on the inner face II, IV of the inner or the outer pane 2, 3 or the outer face III of the inner pane 3 (not shown in FIG. 2). As a result of the fact that the reflection layer 9 extends over the entire inner face II of the outer pane 2, not only the region overlapping the first masking strip 5 can be used for reflection of an image. It is possible to use other image display devices which, for example, irradiate regions of the reflection layer 9 that are not in overlap with the first masking strip 5. In this way, the function of a head-up display can be used.

The variants depicted in FIGS. 3 and 4 correspond essentially to the variants of FIGS. 1A and 1B such that here only the differences are discussed and, otherwise, reference is made to the description concerning FIGS. 1A and 1B.

Unlike what is depicted in FIG. 1A, in FIG. 3 the bus bars 11, 11' in this variant are not arranged along the edge region of the electrically conductive coating 10 that runs along the side edges of the composite pane 1, but, instead, are arranged in the lower and upper edge region along the lower edge and the upper edge of the composite pane 1. The length of the bus bars 11, 11' corresponds approx. to the extent of the electrically conductive coating 10 along the lower edge or the upper edge of the composite pane 1.

In the variant depicted in FIG. 4, the electrically conductive coating 10 is not electrically contacted by means of bus bars 11, 11'. In this exemplary embodiment, the coating 10 is not used to completely heat the entire composite pane 1, but rather the IR-reflecting properties of the coating 10 are used, for example, to protect the interior of the vehicle against solar radiation and to keep it cool.

Reference is now made to FIGS. 5 to 10, in which enlarged cross-sectional views of various embodiments of the composite pane 1 are depicted. The cross-sectional views of FIGS. 5 to 10 correspond to the section line A-A' in the lower section 13' of the edge region 13 of the composite pane 1, as indicated in FIG. 1B.

Figure 5:
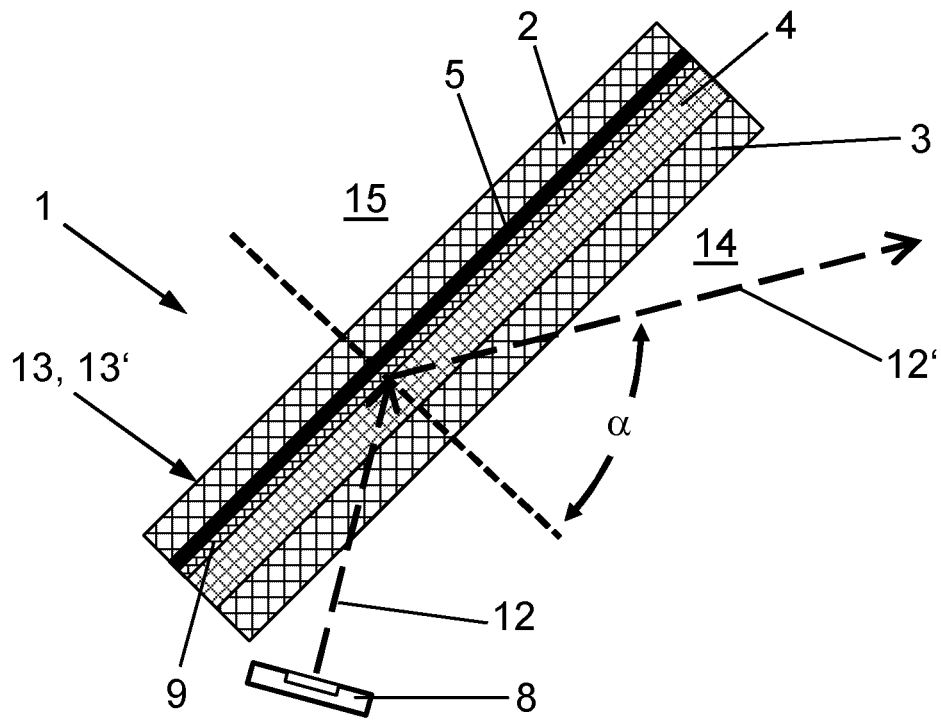

In the variant of the composite pane 1 depicted in FIG. 5, the first (opaque) masking strip 5 is situated on the inner face II of the outer pane 2. The reflection layer 9 is applied directly on the first masking strip 5. The light 12 from the image display device 8 is reflected by the reflection layer 9 into the vehicle interior 14 as reflected light 12'. The light 12, 12' can have s-polarization and/or p-polarization. Due to the angle of incidence of the light 12 on the composite pane 1 close to Brewster's angle, the p-polarized share of the light 12 is hardly impeded in transmittance through the inner pane 3. This variant has the advantage that a relatively large share of the incident p-polarized light 12 is reflected and, then, due to the fact that the angle of incidence is equal to the angle of reflection (depicted in FIGS. 5 to 10 by α), is transmitted, largely unimpeded, through the inner pane 3 into the vehicle interior 14. In addition, the image is readily recognizable against the background of the (opaque) first masking layer 5 with high contrast. The angle of incidence a of the light 12 of the image display device 8 on the inner face IV of the inner pane 3 is, for example, 68°.

The variants depicted in FIGS. 6 to 10 correspond essentially to the variants of FIG. 1A, 1B, and FIG. 5, such that only the differences are discussed here and, otherwise, reference is made to the description concerning FIGS. 1A, 1B, and 5.

Figure 6:
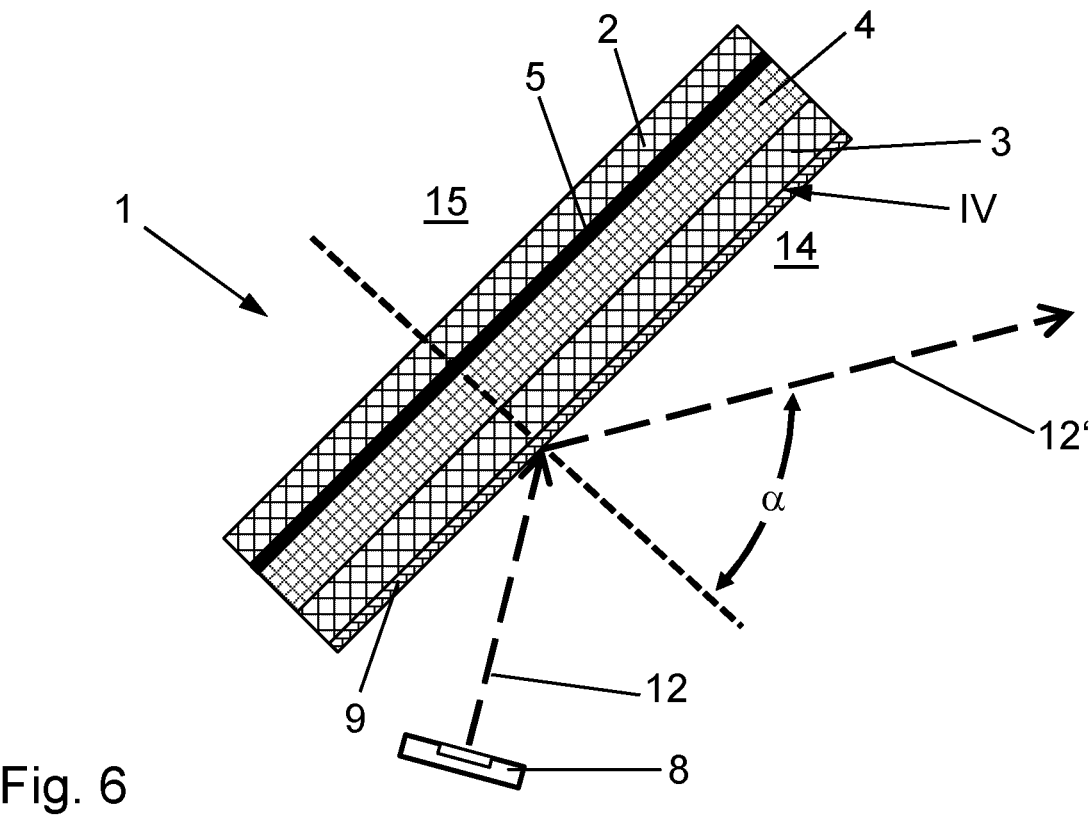

Unlike what is depicted in FIG. 5, in FIG. 6 the reflection layer 9 is not applied on the first masking strip 5, but, instead, on the inner face IV of the inner pane 3. This variant has the advantage that the incident light 12 is not impeded by transmittance through the inner pane 3. In addition, it is also preferred for light 12 with a high s-polarized component since there are fewer double images due to reflection on the inner pane 3.

Figure 7:
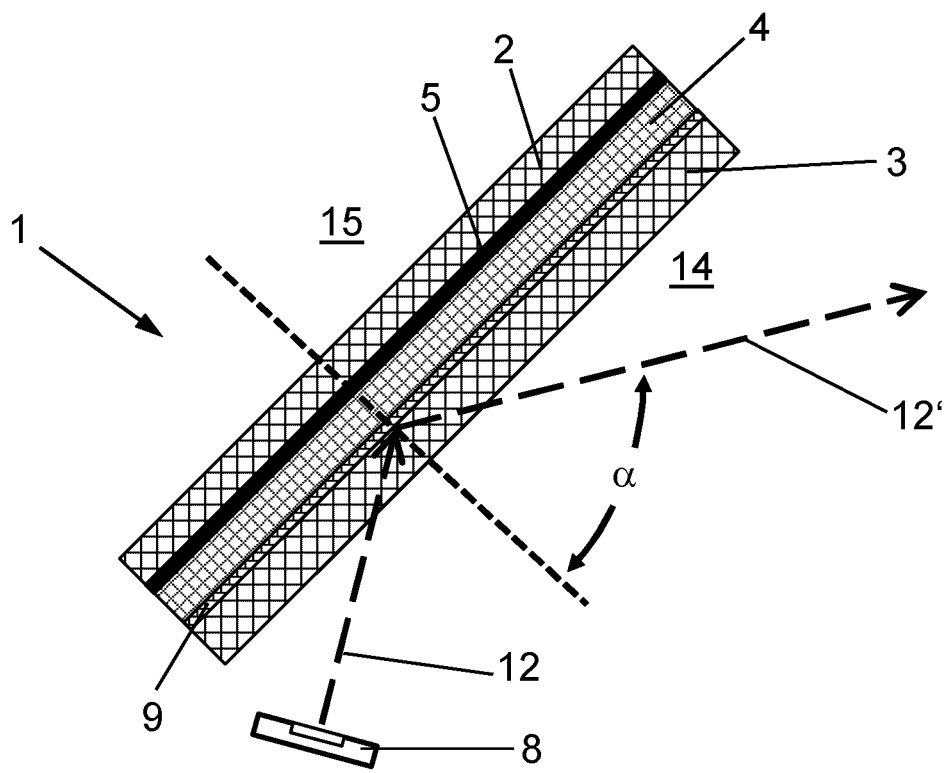

Unlike what is depicted in FIG. 5, in FIG. 7 the reflection layer 9 is not applied on the first masking strip 5, but, instead, on the outer face III of the inner pane 3. This variant is in particular suitable when the first masking strip 5 cannot be coated with the reflection layer 9 or when the two-stage application of first the masking strip 5 and second the reflection layer 9 is not suitable.

Figure 8:
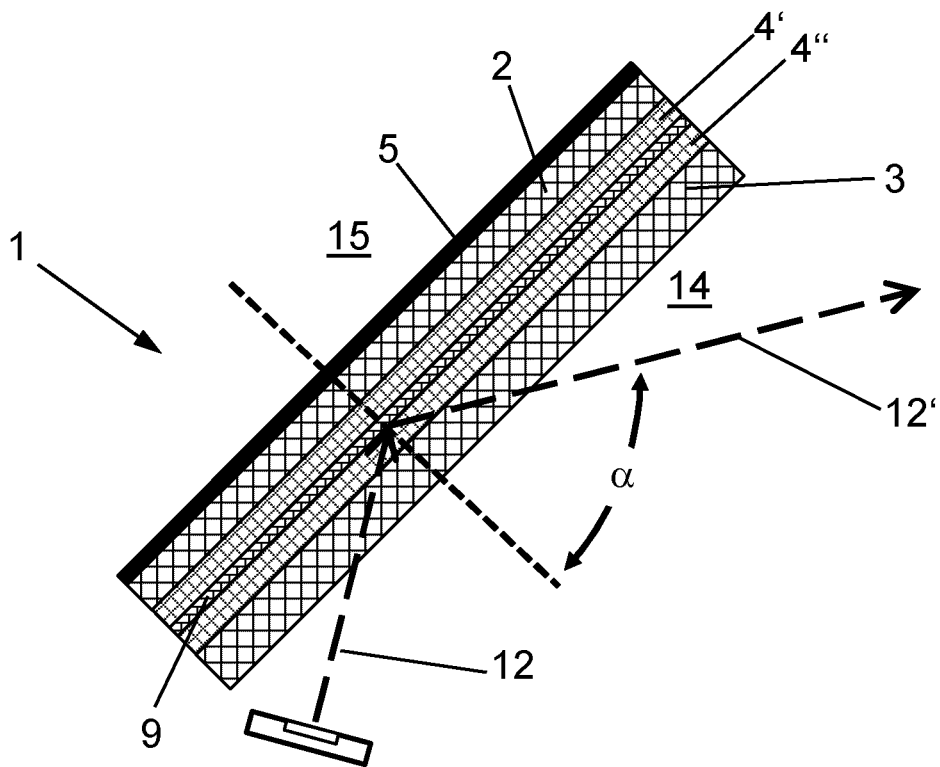

The variant of the composite pane 1 depicted in FIG. 8 differs from the variant of FIG. 5 in that the reflection layer 9 is implemented as a reflecting film that reflects light 12 into the vehicle interior 14. This variant represents a viable alternative to the reflection layer 9 shown in FIGS. 5, 6, and 7, which is, for example, vapor deposited onto the masking strip 5 using the PVD Technik.

As a further difference from the variant of FIG. 5, the reflection layer 9 in FIG. 8 is laminated between two thermoplastic intermediate layers 4', 4" (e.g., PVB films) in the composite pane 1. In order to compensate for height differences (thickness jump) caused by the reflection layer 9 relative to the rest of the composite pane 1, it is advantageous for the thermoplastic intermediate layers 4, 4' to have a correspondingly smaller thickness than outside the region, where the reflection layer 9 is not provided. Thus, a uniform distance (i.e., constant total thickness) between the outer pane 2 and the inner pane 3 can be achieved such that any glass breakage during lamination is reliably and safely avoided. The first masking strip 5 is also not arranged on the inner face II, but rather on the outer face I of the outer pane 2. When, for example, PVB films are used, they have a smaller thickness in the region of the reflection layer 9 than where no reflection layer 9 is provided. In addition, the image is easily recognizable against the background of the opaque (first) masking layer 5 with high contrast. In the interior of the composite pane 1, the reflection layer 9 is well protected against external influences.

Figure 9:
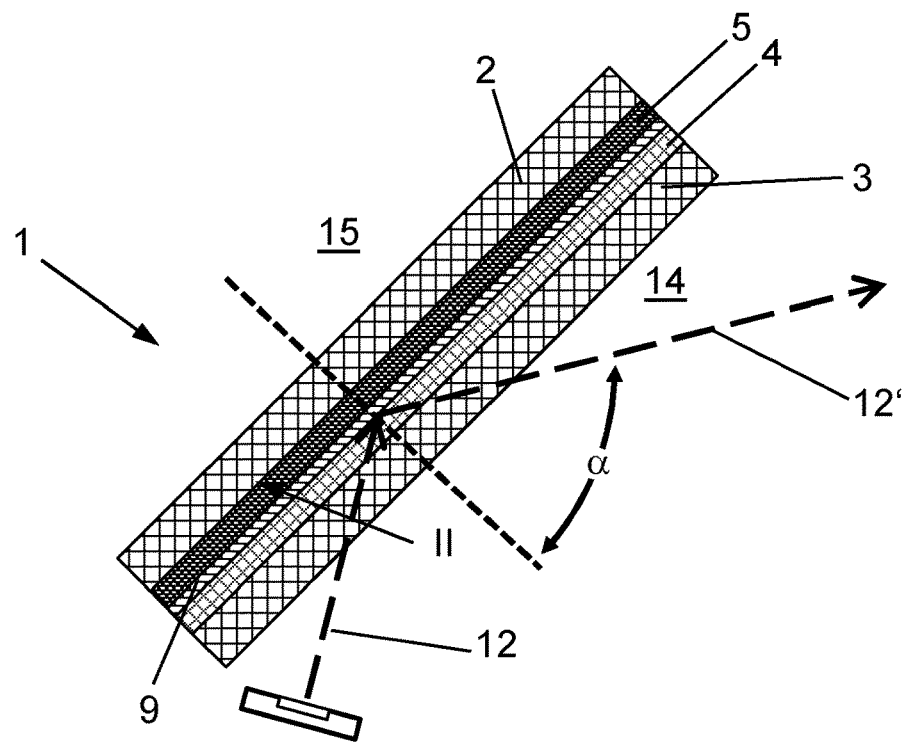

The variant of the composite pane 1 depicted in FIG. 9 differs from the variant of FIG. 8 only in that the first (opaque) masking strip 5 is implemented as a thermoplastic intermediate layer impermeable to light that is arranged on the inner face II of the outer pane 2. The first masking strip 5 is formed, for example, based on a colored PVB, EVA, or PET film. In this case, the reflection layer 9 is laminated between the thermoplastic intermediate layer 4 and the first masking strip 5.

Figure 10:
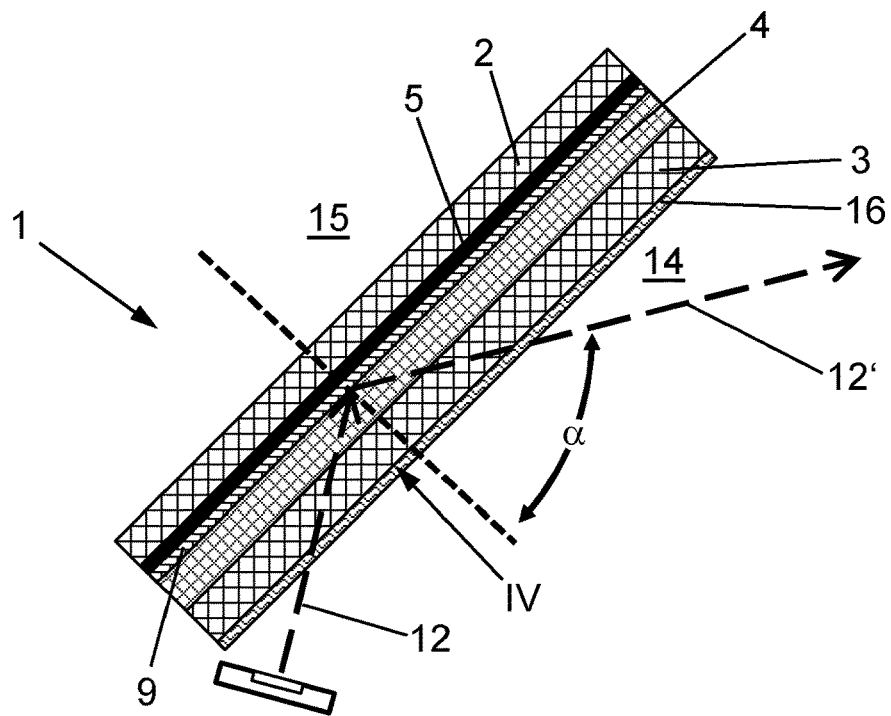

The variant of the composite pane 1 depicted in FIG. 10 differs from the variant of FIG. 5 only in that a high-refractive-index coating 14 is arranged on the inner face IV of the inner pane 3. The high-refractive-index coating 14 is applied, for example, by means of the sol-gel method and consists of a titanium oxide coating. Due to the higher refractive index (for example, 1.7) of the high-refractive-index coating 14 compared to the inner pane 3, Brewster's angle, normally at approx. 56.5° (for soda lime glass) can be changed, which simplifies the application and reduces the effect of interfering double images due to reflection at the inner face IV of the inner pane 3.

In all exemplary embodiments, the reflection layer 9 is arranged toward the vehicle interior relative to the first masking strip 5, i.e., when viewed from the inner face of the composite pane 1, the reflection layer 9 is arranged in front of the first masking strip 5.

It follows from the above statements that the invention makes available an improved composite pane for a projection assembly that enables good image display with high contrast. Undesirable secondary images can be avoided. Due to the use of the electrically conductive coating together with the composite pane, the space in the dashboard region can be significantly reduced when installed in a vehicle, enabling possibilities for a slimmer design in the vehicle interior. By means of the image display via the reflection layer in front of the masking strip, the display usually attached to the dashboard with the speedometer, tachometer, warning indicators, and fuel gauge can be replaced. The heating of the composite pane by the electrically conductive layer replaces supply lines that usually direct air heated by engine heat to the windshield. Furthermore, there are additional geometric degrees of freedom in the design of the vehicle interior when the air outlet nozzles that are usually mounted in a specific geometric relationship to the glazing are omitted. The composite pane according to the invention can be produced simply and economically using known production methods.

LIST OF REFERENCE CHARACTERS 1 composite pane
2 outer pane
3 inner pane
4, 4', 4" thermoplastic intermediate layer
5 first masking strip
6 second masking strip
7 dashboard
8 image display device
9 reflection layer
10 electrically conductive coating
11, 11' bus bar
12, 12' light
13, 13', 13" edge region
14 vehicle interior
15 external surroundings
16 high-refractive-index coating
100 projection assembly
I outer face of the outer pane 2
II inner face of the outer pane 2
III outer face of the inner pane 3
IV inner face of the inner pane 3
A-A' section line

The invention claimed is:

1. A composite pane comprising:
    an outer pane, an inner pane, and a thermoplastic intermediate layer arranged between the outer pane and the inner pane, wherein
    the outer pane and the inner pane have in each case an outer face and an inner face, and the inner face of the outer pane and the outer face of the inner pane face one another,
    a first masking strip, which is arranged regionally on the outer face of, and in contact with, the inner pane or the inner face of, and in contact with, the outer pane such that the first masking strip covers only part of the outer face of the inner pane or only part of the inner face of the outer pane,
    an electrically conductive coating, and
    a reflection layer, which is adapted to specularly reflect light,
    wherein the reflection layer is arranged spatially in front of the first masking strip when viewed from the inner pane toward the outer pane, wherein the first masking strip overlaps the reflection layer at least in one region.

2. The composite pane according to claim 1, wherein the reflection layer is arranged on the outer face of the inner pane or on one of the inner faces of the inner pane or the outer pane, within the thermoplastic intermediate layer, or on the first masking strip, and the first masking strip has a larger surface area than the reflection layer and completely overlaps the reflection layer.

3. The composite pane according to claim 1, wherein the first masking strip is arranged circumferentially as a frame in an edge region of the outer pane.

4. The composite pane according to claim 1, wherein the first masking strip is implemented as an opaque thermoplastic composite film and is arranged on the inner face of the outer pane.

5. The composite pane according to claim 1, wherein the reflection layer is implemented as a coated carrier film or an uncoated polymer film and is arranged within the thermoplastic intermediate layer.

6. A composite pane comprising:
    an outer pane, an inner pane, and a thermoplastic intermediate layer arranged between the outer pane and the inner pane, wherein
    the outer pane and the inner pane have in each case an outer face and an inner face, and the inner face of the outer pane and the outer face of the inner pane face one another,
    a first masking strip, which is arranged regionally on the outer face of the inner pane or the inner face of the outer pane,
    an electrically conductive coating, and
    a reflection layer, which is adapted to reflect light,
    wherein the reflection layer is arranged spatially in front of the first masking strip when viewed from the inner pane toward the outer pane, wherein the first masking strip overlaps the reflection layer at least in one region,
    wherein a high-refractive-index coating having a refractive index of at least 1.7 is arranged at least in a region of the inner face of the inner pane that is in overlap with the reflection layer, and wherein the reflection layer is arranged spatially closer to the outer face of the outer pane but spatially farther from the inner face of the inner pane than the high-refractive-index coating.

7. The composite pane according to claim 6, wherein the high-refractive-index coating has a refractive index of at least 1.9.

8. The composite pane according to claim 1, wherein the electrically conductive coating contains silver (Ag), indium tin oxide (ITO), fluorine-doped tin oxide ($SnO_2$:F), or aluminum-doped zinc oxide (ZnO:Al).

9. The composite pane according to claim 1, wherein the electrically conductive coating is connected, in an edge region of the outer pane or the inner pane, to two bus bars provided for connection to a voltage source such that a current path for a heating current is formed between the two bus bars.

10. The composite pane according to claim 1, wherein the electrically conductive coating is arranged on the entire inner face of the outer pane or the entire outer face of the inner pane minus a circumferential edge region of the outer pane or the inner pane.

11. A projection assembly, comprising:
a composite pane according to claim 1, and
an image display device associated with the reflection layer and having an image display directed at the reflection layer, the image of which is reflected by the reflection layer, wherein at least the region of the reflection layer that is in overlap with the first masking strip is irradiated by the image display device.

12. The projection assembly according to claim 11, further comprising a field-of-view camera, which is adapted to capture the field of view of a user, and which interacts with the image display device and the composite pane such that the user is capable of optimally capturing the image reflected via the reflection layer visually.

13. The projection assembly according to claim 11, further comprising a functional element that is adapted to recognize freehand movements of the user and that interacts with the image display device such that information that is usable to control the image display device is obtainable from the freehand movements of the user.

14. A method for producing a composite pane according to claim 1, comprising:
providing the outer pane, the inner pane, and the thermoplastic intermediate layer,
arranging the first masking strip regionally on the outer face of the inner pane or the inner face of the outer pane,
introducing the electrically conductive coating,
arranging the thermoplastic intermediate layer between the outer pane and the inner pane such that a layer stack is formed, and
laminating the layer stack to form a composite pane.

15. A method comprising providing a composite pane according to claim 1 in a vehicle for traffic on land, in the air, or on water.

16. The composite pane according to claim 1, wherein the composite pane is a pane of a projection assembly.

17. The composite pane according to claim 3, wherein the first masking strip has, in a section that is in overlap with the reflection layer, a greater width than in sections different therefrom.

18. The composite pane according to claim 7, wherein the high-refractive-index coating has a refractive index of at least 2.0.

19. The composite pane according to claim 10, wherein the width of the circumferential edge region of the outer pane or the inner pane is from 5 mm to 100 mm.

20. The method according to claim 15, wherein the composite pane is a vehicle windshield.

21. The method according to claim 1, wherein a surface area of the first masking strip is greater than a surface area of the reflection layer.

* * * * *